(12) United States Patent
Kim et al.

(10) Patent No.: US 11,630,992 B2
(45) Date of Patent: Apr. 18, 2023

(54) NEURAL NETWORK GENERATION METHOD FOR NEUROMORPHIC COMPUTING AND APPARATUS FOR THE SAME

(71) Applicant: ELECTRONICS AND TELECOMMUNICATIONS RESEARCH INSTITUTE, Daejeon (KR)

(72) Inventors: Yong-Joo Kim, Sejong (KR); Tae-Ho Kim, Daejeon (KR); Eun-Ji Pak, Daejeon (KR); Young-Mok Ha, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 418 days.

(21) Appl. No.: 16/894,276

(22) Filed: Jun. 5, 2020

(65) Prior Publication Data
US 2021/0004666 A1 Jan. 7, 2021

(30) Foreign Application Priority Data

Jul. 5, 2019 (KR) .................. 10-2019-0081141
Apr. 21, 2020 (KR) .................. 10-2020-0047906

(51) Int. Cl.
*G06N 3/08* (2023.01)
*G06N 3/063* (2023.01)
*G06N 3/02* (2006.01)

(52) U.S. Cl.
CPC .............. *G06N 3/063* (2013.01); *G06N 3/02* (2013.01); *G06N 3/08* (2013.01)

(58) Field of Classification Search
CPC ............ G06N 3/063; G06N 3/08; G06N 3/04; G06N 3/0635; G06N 20/00; G06N 3/0454;
(Continued)

(56) References Cited

U.S. PATENT DOCUMENTS 9,111,224 B2   8/2015 Hunzinger
2017/0368682 A1* 12/2017 Danjo .................. G06N 3/082
(Continued)

FOREIGN PATENT DOCUMENTS

CN  105512723 B   2/2018
KR  1020180028966 A  3/2018
(Continued)

*Primary Examiner* — Quan M Hua (57) ABSTRACT

Disclosed herein are a neural network generation method for neuromorphic computing and an apparatus for the same. The neural network generation method for neuromorphic computing includes selecting at least one part of a brain corresponding to a neural network function requested to be generated by an application, determining whether an existing neural network corresponding to the at least one part of the brain is present in a neural network database, when it is determined that no existing neural network is present in the neural network database, generating new neural network configuration information corresponding to the part of the brain based on a brain information database, generating a new neural network by mapping the new neural network configuration information to neuromorphic hardware based on the new neural network configuration information, and storing the new neural network in the neural network database.

18 Claims, 5 Drawing Sheets

(58) Field of Classification Search
CPC ........ G06N 3/049; G06N 3/084; G06N 3/082;
G06N 3/02; G06N 3/088; G06N 3/0481;
G06N 3/086; G16B 20/00; G16B 40/00;
G16B 35/00; G16B 40/20; G16B 5/00;
G16B 5/10; G16B 50/30; G16B 99/00;
G06K 9/623; G06K 9/6262; G16C 20/70;
G16C 20/90
See application file for complete search history.

(56) References Cited

U.S. PATENT DOCUMENTS

| | | | |
|---|---|---|---|
| 2018/0075339 A1 | | 3/2018 | Ma et al. |
| 2018/0174033 A1* | | 6/2018 | Davies ..................... G06N 3/08 |
| 2018/0260709 A1 | | 9/2018 | Zhang et al. |
| 2018/0349508 A1* | 12/2018 | | Bequet ................. G06F 9/5027 |
| 2019/0138900 A1 | | 5/2019 | Linares-Barranco et al. |
| 2019/0311244 A1 | 10/2019 | | Oh et al. |
| 2019/0392291 A1 | 12/2019 | | Park et al. |

FOREIGN PATENT DOCUMENTS

| | | |
|---|---|---|
| KR | 1020190016311 A | 2/2019 |
| KR | 1020190051766 A | 5/2019 |

\* cited by examiner

NEURAL NETWORK GENERATION METHOD FOR NEUROMORPHIC COMPUTING AND APPARATUS FOR THE SAME

CROSS REFERENCE TO RELATED APPLICATIONS

This application claims the benefit of Korean Patent Application Nos. 10-2019-0081141, filed Jul. 5, 2019 and 10-2020-0047906, filed Apr. 21, 2020, which are hereby incorporated by reference in their entireties into this application.

BACKGROUND OF THE INVENTION

1. Technical Field

The present invention relates to technology for configuring a neuromorphic system, which is an artificial intelligence system for imitating the human brain.

2. Description of the Related Art

Current Artificial Intelligence (AI) fields may be subdivided into weak artificial intelligence and strong artificial intelligence. The term "weak artificial intelligence" refers to artificial intelligence that carries out a given task in a single specific field in accordance with instructions from humans. A Deep Neural Network (DNN), which is widely studied these days, is a method of weak artificial intelligence.

Neuromorphic computing is a representative research field of strong artificial intelligence. Neuromorphic computing is an engineering field that attempts to simulate human brain functions by creating a circuit in the form of hardware that imitate the way the brain works, consisting of neurons and synapses. The imitated circuit is referred to as a "neuromorphic circuit", and the creation of artificial intelligence using the neuromorphic circuit is referred to as "neuromorphic computing". This scheme enables a high-level artificial intelligence system to be configured with less area and lower power than conventional machine learning method because the circuit itself consists only of neurons and synapses. The conventional machine learning method abstracts brain's behavior and makes a Central Processing Unit (CPU) or a Graphics Processing Unit (GPU) operate the entirety of the circuit, whereas neuromorphic computing is advantageous in that power consumption is much lower than that of a machine-learning scheme because it only needs to operate the neurons that react to input signals by imitating each neuron cell in the brain.

Current neuromorphic computing systems are implemented using various types of hardware systems. The hardware systems for neuromorphic computing systems are implemented to simulate the brain as similar as possible, but also to work efficiently in terms of power consumption and performance. Thus, the current research of neuromorphic computing system focuses simply on the implementation of neurons and synapses themselves well using hardware.

However, the neurons and synapses forming the brain actually appear in various forms. Interneurons (i.e., a central nervous system) that make up the brain may be classified into various forms, such as a pyramid cell, a stellate cell, a basket cell, and a chandelier cell according to the shape thereof. Also, for respective neuron types, there are various lengths of axons forming the corresponding neurons, various locations of dendrites, etc. For example, the length of an axon, which connects a neuron to another neuron, may have various values ranging from 1 μm to 1 m. Further, a synapse which is connected at the axon to other neuron may transmit signals electrically using electrical conduction phenomenon, or may transmit signals chemically by moving a neurotransmitter. As described above, the neurons and synapses differ in the types, numbers, and connection types that are mainly composed of parts of the brain. Therefore, in order to imitate the brain as closely as possible, it is necessary to first determine parts of the brain and neurons forming the parts of the brain to implement required functions.

Accordingly, the present invention is intended to propose technology that can configure a neural network in an optimal form in which the brain is imitated as closely as possible according to the situation and purpose using the neuromorphic computing system, rather than technology that simply implements neurons and synapses as closely to the brain as possible.

PRIOR ART DOCUMENTS

Patent Documents (Patent Document 1) Korean Patent Application Publication No. 10-2019-0051766 (Date of Publication: May 15, 2019)

SUMMARY OF THE INVENTION

Accordingly, the present invention has been made keeping in mind the above problems occurring in the prior art, and an object of the present invention is to provide a neural network generation method and apparatus for neuromorphic computing, which store information about the configuration form of brain neurons depending on respective parts of the brain and which configure a neural network in an optimal form in which the brain is imitated as closely thereto as possible depending on the situation and purpose in which a neuromorphic computing system is used based on the stored information.

Another object of the present invention is to provide a method that can configure a neural network which performs the functions requested by an application in consideration of the resources of neuromorphic hardware.

In accordance with an aspect of the present invention to accomplish the above objects, there is provided a neural network generation method for neuromorphic computing, including selecting at least one part of a brain corresponding to a neural network function requested to be generated by an application; determining whether an existing neural network corresponding to the at least one part of the brain is present in a neural network database; when it is determined that no existing neural network is present in the neural network database, generating new neural network configuration information corresponding to the part of the brain based on a brain information database; generating a new neural network by mapping the new neural network to neuromorphic hardware based on the new neural network configuration information; and storing the new neural network in the neural network database.

The brain information database may include brain subpart connection information, which is the information about connections between brain subparts forming the part of the brain, brain subpart configuration information, which is the information about configuration of the brain subparts, neuron structure information, and neuron connection information.

Generating the new neural network configuration information may include configuring the brain subparts based on the brain subpart connection information; establishing neuron sets that form the brain subparts based on the brain subpart configuration information; and configuring neurons that form the neuron sets based on the neuron structure information and the neuron connection information.

Generating the new neural network may include creating a neural network graph corresponding to the new neural network configuration information; creating a resource graph corresponding to resource information of the neuromorphic hardware; and mapping the neural network graph to the resource graph using a graph-mapping algorithm.

Generating the new neural network may further include comparing the resource graph with the neural network graph; and adjusting the neural network graph proportionally to the resource graph.

The brain subpart connection information may include a form of connections between the brain subparts, a direction of a flow of connection signals between the brain subparts, or a size of the neural network in a connecting portion.

The brain subpart configuration information may include a number of neurons forming the brain subparts, types of the neurons, or a percentage of configurations for each of the types of the neurons.

The neuron structure information may include sizes and lengths of a soma, a dendrite, and a synapse that form each neuron.

The neuron connection information may include a stimulus delivery scheme, and the stimulus delivery scheme may be any one of an electrical stimulus delivery scheme and a chemical stimulus delivery scheme.

The neural network generation method may further include, when it is determined that the existing neural network is present, loading the existing neural network from the neural network database.

In accordance with another aspect of the present invention to accomplish the above objects, there is provided a neural network configuration apparatus for neuromorphic computing, including a processor configured to select at least one part of a brain corresponding to a neural network function requested to be generated by an application, determine whether an existing neural network corresponding to the at least one part of the brain is present in a neural network database, and when it is determined that no existing neural network is present in the neural network database, generate new neural network configuration information corresponding to the part of the brain based on a brain information database; and a memory configured to store the new neural network configuration information, The brain information database may include brain subpart connection information, which is the information about connections between brain subparts forming the part of the brain, brain subpart configuration information, which is the information about configuration of the brain subparts, neuron structure information, and neuron connection information.

The processor may be configured to configure the brain subparts based on the brain subpart connection information, establish neuron sets that form the brain subparts based on the brain subpart configuration information, and configure neurons that form the neuron sets based on the neuron structure information and the neuron connection information.

The brain subpart connection information may include a form of connections between the brain subparts, a direction of a flow of connection signals between the brain subparts, or a size of the neural network in a connecting portion.

The brain subpart configuration information may include a number of neurons forming the subparts, types of the neurons, or a percentage of configurations for each of the types of the neurons.

The neuron structure information may include sizes and lengths of a soma, a dendrite, and a synapse that form each neuron.

The neuron connection information may include a stimulus delivery scheme, and the stimulus delivery scheme may be any one of an electrical stimulus delivery scheme and a chemical stimulus delivery scheme.

In accordance with a further aspect of the present invention to accomplish the above objects, there is provided a neural network generation apparatus for neuromorphic computing, including a processor configured to receive new neural network configuration information generated based on a brain information database from a neural network configuration apparatus, generate a new neural network by mapping the new neural network to neuromorphic hardware based on the new neural network configuration information, and load an existing neural network from a neural network database; and a memory configured to store the new neural network.

The processor may be configured to create a neural network graph corresponding to the new neural network configuration information, create a resource graph corresponding to resource information of the neuromorphic hardware, and map the neural network graph to the resource graph using a graph-mapping algorithm.

The processor may be configured to compare the resource graph with the neural network graph, and proportionately adjust the neural network graph in conformity with the resource graph.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Advantages and features of the present invention and methods for achieving the same will be clarified with reference to embodiments described later in detail together with the accompanying drawings. However, the present invention are implemented in various forms without being limited to the embodiments described later, and these embodiments are provided so that this invention will be thorough and complete and will fully convey the scope of the present invention to those skilled in the art. The present invention should be defined by the scope of the accompanying claims. The same reference numerals are used to designate the same components throughout the specification.

It will be understood that, although the terms "first" and "second" may be used herein to describe various components, these components are not limited by these terms. These terms are only used to distinguish one component from another component. Therefore, it will be apparent that a first component, which will be described below, may also be a second component without departing from the technical spirit of the present invention.

The terms used in the present specification are merely used to describe specific embodiments and are not intended to limit the present invention. A singular expression includes a plural expression unless a description to the contrary is specifically made in context. In the present specification, it should be understood that terms such as "include" or "have" are merely intended to indicate that features, numbers, steps, operations, components, parts, or combinations thereof are present, and are not intended to exclude the possibility that one or more other features, numbers, steps, operations, components, parts, or combinations thereof will be present or added.

Unless differently defined, all terms used here including technical or scientific terms have the same meanings as terms generally understood by those skilled in the art to which the present invention pertains. Terms identical to those defined in generally used dictionaries should be interpreted as having meanings identical to contextual meanings of the related art, and are not to be interpreted as having ideal or excessively formal meanings unless they are definitely defined in the present specification.

Hereinafter, a neural network generation method for neuromorphic computing and an apparatus for the neural network generation method according to embodiments will be described in detail with reference to FIGS. 1 to 6.

Figure 1:
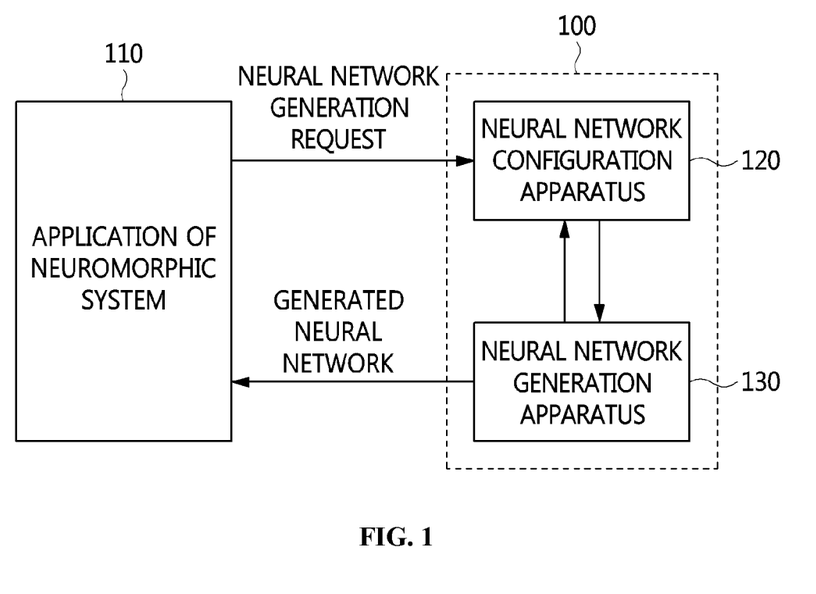
FIG. 1 is a block diagram illustrating a neuromorphic computing system according to an embodiment.

FIG. 1 is a block diagram illustrating a neuromorphic computing system according to an embodiment.

Referring to FIG. 1, the neuromorphic computing system includes an application 110 of a neuromorphic system and a neural network generation system 100. Also, the neural network generation system 100 may include a neural network configuration apparatus 120 and a neural network generation apparatus 130.

In the neuromorphic computing system, the application 110 of the neuromorphic system may transmit a neuromorphic neural network generation request to the neural network generation system 100, and the neural network generation system 100 may receive the request, configure and generate a neural network, and transmit the generated neural network to the application 110.

When the neural network generation request is received, the neural network configuration apparatus 120 may search for a neural network function desired to be used by the application, and may select at least one part of the brain corresponding to the neural network function. Here, the parts of the brain may include a visual processing part, an auditory processing part, etc. For example, when the identification of an image is requested, the visual processing part may be selected from among the parts of the brain, and when simultaneous identification of sound (audio) and an image is requested, both the visual processing part and the auditory processing part may be selected from among the parts of the brain.

Further, the neural network configuration apparatus 120 may determine whether an existing neural network corresponding to the at least one part of the brain is present in a neural network database (or a neural network DB). The neural network DB is a DB in which neural networks previously generated by the neural network generation system 100 are stored. When an existing neural network that is capable of performing the function required by the application is present, there is no need to configure and generate a new neural network. Thus, the neural network configuration apparatus 120 may first check the neural network DB, and the neural network generation system 100 may generate a new neural network only when no existing neural network is present in the neural network DB.

Therefore, when an existing neural network is present, the neural network configuration apparatus 120 may load the existing neural network from the neural network DB. Further, when no existing neural network is present, the neural network configuration apparatus 120 may generate new neural network configuration information corresponding to the part of the brain based on a brain information database (or a brain information DB).

Neurons and synapses that form the neuromorphic computing system actually appear in various forms. Interneurons (i.e., central nervous systems) forming the brain may be classified into various forms, such as a pyramid cell, a stellate cell, a basket cell, and a chandelier cell, according to the shape thereof. Also, for respective neuron types, there are various lengths of axons forming the corresponding neurons, various locations of dendrites, etc. A synapse which is connected at an axon to another neuron may deliver information using an electrical conduction phenomenon as a signal delivery scheme, or may chemically deliver information by moving a neurotransmitter as the signal delivery scheme. As described above, the types and numbers of neurons and synapses that are chiefly configured may differ depending on the parts of the brain. Therefore, the database that stores information about neurons and synapses constituting the parts of the brain may be the brain information DB.

The brain information DB may include brain subpart connection information, which is the information about connections between brain subparts constituting respective parts of the brain, brain subpart configuration information, which is the information about the configuration of the brain subparts, neuron structure information, and neuron connection information. Therefore, the neural network configuration apparatus 120 may perform operations of configuring the brain subparts based on the brain subpart connection information, establishing neuron sets which form the brain subparts based on the brain subpart configuration information, and configuring neurons which form the neuron sets based on the neuron structure information and the neuron connection information.

Further, the brain subpart connection information may include information about connections forms between the brain subparts, the direction of flow of connection signals between the brain subparts, or the size of the neural network in connecting portions. The brain subpart configuration information may include the number of neurons forming each subpart, the types of the neurons or the percentage of configurations for each of the types of the neurons (or the composition ratio of the respective neuron types). The neuron structure information may include the sizes and lengths of a soma (i.e., a nerve cell body), dendrites, and synapses, which form each neuron. The neuron connection information may include a stimulus delivery scheme, which may be any one of an electrical stimulus delivery scheme and a chemical stimulus delivery scheme.

That is, in order to configure a new neural network, information about brain subparts and neurons which constitute the part of the brain is loaded from the brain information DB. The brain subparts may be configured using the brain subpart connection information stored in the brain information DB, neuron sets may be assigned using the (brain) subpart configuration information, and respective neurons may be individually and specifically set using the neuron structure information and the neuron connection information.

For example, it is assumed that the application requests the generation of a 'neural network for identifying an object from a camera input image'. The part of the brain corresponding to the function of the neural network may be the visual processing part of the brain. Also, subparts constituting the visual processing part of the brain may be selected. Pieces of information about the number and types of neurons forming the subparts, the composition ratio of the neurons, and the form of the connections between the neurons are loaded from the brain information DB. Further, information about the form in which the subparts are connected is loaded from the brain information DB. Furthermore, the information about the structure of neurons belonging to the subparts, among the various types of neurons, may be loaded, thus enabling the neuromorphic hardware to set and use the accurate structures of the corresponding neurons. That is, a neural network that is capable of processing the requested function may be generated using the configuration information loaded from the brain information DB.

In an example in which the visual processing part is configured, subparts, such as V1 for sensing a color, V2 for sensing a shape, V3 for sensing a change in color, and V4 for sensing a change in shape, may be selected. Also, based on the brain subpart connection information, V1 may be coupled to V3, V2 may be coupled to V4, and V3 and V4 may be coupled to each other. Further, neuron sets which form the subparts V1, V2, V3, and V4 are selected. Each neuron set may include the total number of neurons, the neuron connection method, the composition ratio of the respective neuron types (kinds), the structures of respective neurons, etc. For example, a neuron set which forms V1 may be established such that 100 neurons are connected in series and are configured at a 1:1 ratio of pyramid cells to stellate cells and such that some specific neurons, among the 100 neurons, have a soma, dendrites, and synapses, the sizes or lengths of which are twice those of normal neurons, and a scheme for connecting individual neurons is set only to an electrical stimulus delivery scheme.

As a result, the neural network configuration apparatus 120 may collect information about neuron sets and neurons constituting each part from the brain information DB, and may generate the new neural network configuration information. Therefore, in order to implement the neuromorphic computing system, a procedure for constructing the brain information DB must be performed in advance. Further, the brain information DB may be constructed differently depending on the user and the usage environment of the system.

When the neural network configuration apparatus 120 obtains the new neural network configuration information by performing the above-described operation, the neural network generation apparatus 130 may generate a new neural network by mapping the new neural network to neuromorphic hardware based on the neural network configuration information.

The neural network generation apparatus 130 may create a neural network graph corresponding to the new neural network configuration information, and may create a resource graph corresponding to the hardware resource information. Further, the neural network generation apparatus 130 may map the neural network graph to the resource graph using a graph-mapping algorithm. In this way, the neural network generation apparatus 130 may generate a new neural network based on the neuromorphic hardware. The neural network generation apparatus 130 may further perform the operations of comparing the resource graph with the neural network graph and adjusting the neural network graph proportionally to the resource graph.

That is, the generated neural network may be mapped to the neuromorphic hardware in accordance with the neuromorphic hardware resource information. The mapping algorithm used here may be an existing graph-mapping algorithm, and is intended to map the neural network graph to the resource graph. In a neural network that matches each purpose, the types and numbers of neurons required for each subpart of the brain are designated. When the hardware resources that are provided do not match the designated types and numbers, there is a need to proportionately adjust the neural network in accordance with the resources during a mapping procedure. In particular, when the resources are insufficient, the neural network must be reduced and mapped.

The new neural network generated based on the hardware in this way may be stored in the neural network DB. That is, when the use of the new neural network in the application of the neuromorphic system is terminated or when a neural network required by the application is changed to another neural network, the new neural network may be stored together with changed internal parameter values in the neural network DB, and may then be prepared for a subsequent request from the application.

Figure 2:
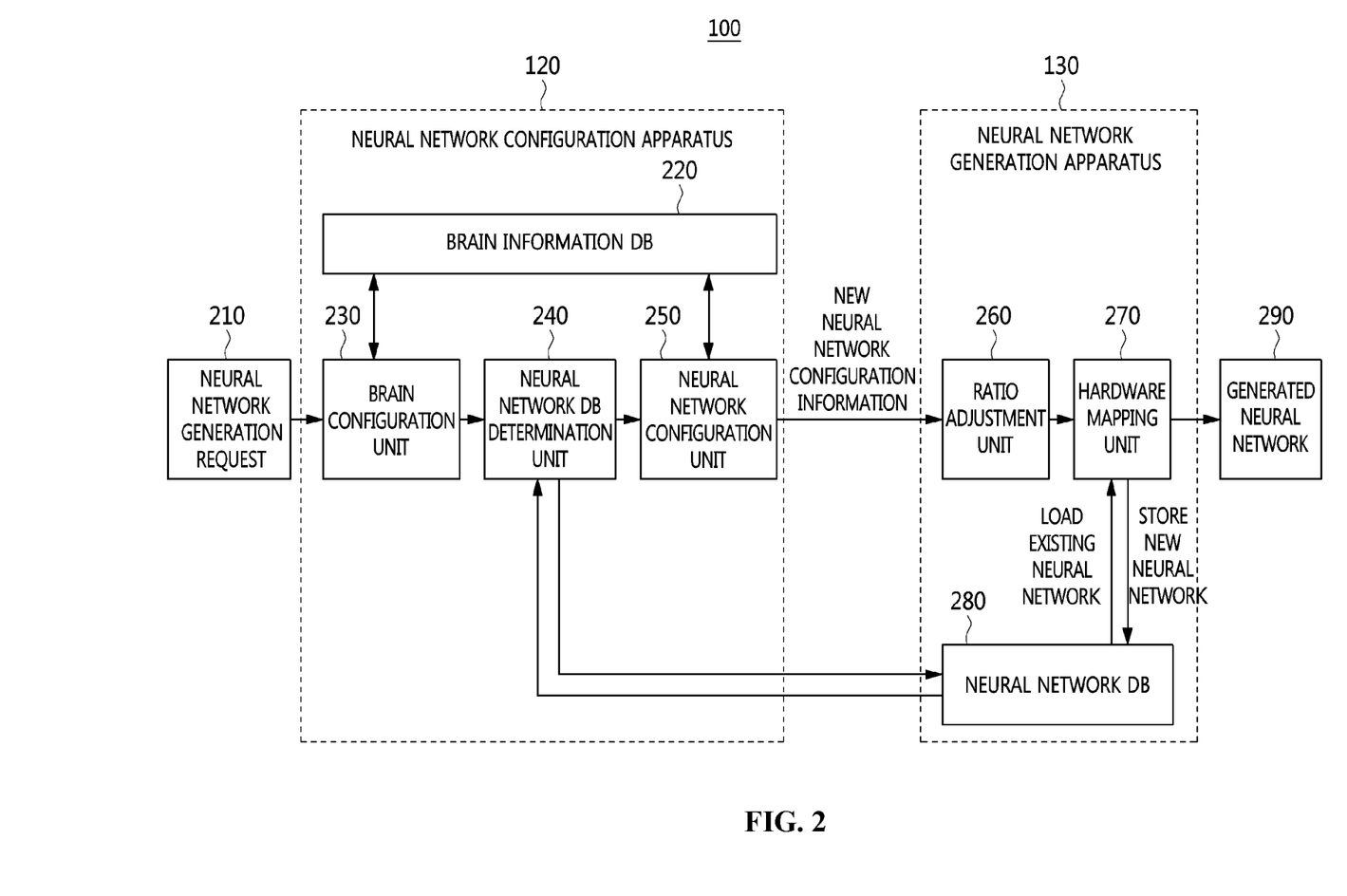
FIG. 2 is a block diagram illustrating an example of a neural network generation system for neuromorphic computing illustrated in FIG. 1.

FIG. 2 is a block diagram illustrating an example of the neural network generation system 100 for neuromorphic computing illustrated in FIG. 1.

Referring to FIG. 2, the neural network generation system 100 for neuromorphic computing includes a neural network configuration apparatus 120 and a neural network generation apparatus 130. The neural network configuration apparatus 120 may receive a neuromorphic neural network generation request 210 from an application of a neuromorphic system and generate new neural network configuration information. The neural network generation apparatus 130 may receive the new neural network configuration information, generate a new neural network by mapping the new neural network to neuromorphic hardware, and transmit a generated neural network 290.

The neural network configuration apparatus 120 may include a brain configuration unit 230, a neural network DB determination unit 240, a neural network configuration unit 250, and a brain information DB 220. The brain configuration unit 230 may select at least one part of the brain corresponding to the neural network function requested to be generated by the application. The neural network DB determination unit 240 may determine whether an existing neural network corresponding to the at least one part of the brain is present in a neural network database (DB) 280. When no existing neural network is present in the neural network DB 280, the neural network configuration unit 250 may generate new neural network configuration information corresponding to the at least one part of the brain based on the brain information DB 220.

When the neural network generation request 210 is received, the brain configuration unit 230 may search for a neural network function desired to be used by the application, and may select at least one part of the brain corresponding to the neural network function. Here, the part of the brain may also be selected with reference to the information stored in the brain information DB 220. Here, the selected at least one part of the brain may include a visual processing part, an auditory processing part, etc. For example, when the identification of an image is requested, the visual processing part may be selected from among the parts of the brain, and when simultaneous identification of sound (audio) and an image is requested, the visual processing part and the auditory processing part may be selected from among the parts of the brain.

The neural network DB determination unit 240 may determine whether an existing neural network corresponding to the at least one part of the brain is present in the neural network DB 280. The neural network DB 280 is a database (DB) in which neural networks previously generated by the neural network generation apparatus 130 are stored. If it is determined that the existing neural network that is capable of performing the function required by the application is present, there is no need to configure and generate a new neural network. Thus, the neural network DB determination unit 240 first checks the neural network DB and needs to generate a new neural network only when no existing neural network is present. Therefore, the neural network DB determination unit 240 may send a signal instructing a new neural network to be configured to the neural network configuration unit 250 when no existing neural network is present, and may send a signal instructing an existing neural network to be loaded to the neural network DB 280 when there is the existing neural network.

When the signal instructing a new neural network to be configured is received from the neural network DB determination unit 240, the neural network configuration unit 250 may generate the new neural network configuration information corresponding to the selected at least one part of the brain based on the brain information DB 220.

The brain information DB 220 may include brain subpart connection information, which is the information about connections between brain subparts which constitute each part of the brain, brain subpart configuration information, which is the information about the configuration of the brain subparts, neuron structure information, and neuron connection information. Therefore, the neural network configuration unit 250 may perform the operations of configuring the brain subparts based on the brain subpart connection information, establishing neuron sets which form the brain subparts based on the brain subpart configuration information, and configuring neurons which form the neuron sets based on the neuron structure information and the neuron connection information.

Further, the brain subpart connection information may include the form of connections between the brain subparts, the direction of a flow of connection signals between the brain subparts, or the size of the neural network in connecting portions. The brain subpart configuration information may include the number of neurons forming each subpart of the brain, the types of the neurons or the composition ratio of the respective neuron types. The neuron structure information may include the sizes and lengths of a soma (i.e., a nerve cell body), dendrites, and synapses, which form each neuron. The neuron connection information may include a stimulus delivery scheme, which may be any one of an electrical stimulus delivery scheme and a chemical stimulus delivery scheme.

That is, in order to configure a new neural network, the neural network configuration unit 250 loads information about subparts and neurons of the brain, which constitute the part of the brain, from the brain information DB. The subparts may be configured using the brain subpart connection information stored in the brain information DB, neuron sets may be assigned using the subpart configuration information, and respective neurons may be individually and specifically set using the neuron structure information and the neuron connection information.

For example, when the application requests the generation of a 'neural network for identifying an object from a camera input image', the part of the brain corresponding to the function of the neural network may be the visual processing part of the brain. Also, subparts constituting the visual processing of the brain may be selected. As the subparts, the subparts, such as V1 for sensing a color, V2 for sensing a shape, V3 for sensing a change in color, and V4 for sensing a change in shape, may be selected. Further, based on the subpart connection information, V1 may be coupled to V3, V2 may be coupled to V4, and V3 and V4 may be coupled to each other. Further, neuron sets which form the subparts V1, V2, V3, and V4 are selected. Each neuron set may include the total number of neurons, a neuron connection method, the distribution ratio of respective neuron types (kinds), the structures of respective neurons, etc. For example, a neuron set which forms V2 may be established such that 50 neurons are connected in parallel and are configured at a 2:1 ratio of basket cells to chandelier cells and such that some specific neurons, among the 50 neurons, have a soma (i.e., a nerve cell body), dendrites, and synapses, the sizes or lengths of which are ½ of those of normal neurons, and a scheme for connecting individual neurons is set only to a chemical stimulus delivery scheme. Also, the remaining subparts V1, V3, and V4 may be configured in the same manner as the above-described V2, but the configuration forms thereof may be similar to or different from that of V2.

As a result, the neural network configuration unit 250 may collect information about neuron sets and neurons constituting each part of the brain from the brain information DB, and may then generate the new neural network configuration information. Also, a procedure for constructing the brain information DB must be performed prior to the configuration and generation of the neural network, and the brain information DB may be constructed differently depending on the user and the usage environment of the system.

The new neural network configuration information generated by the neural network configuration unit 250 is transferred to the neural network generation apparatus 130. The neural network generation apparatus 130 may generate a new neural network by mapping the new neural network to the neuromorphic hardware based on the new neural network configuration information.

The neural network generation apparatus 130 may include a ratio adjustment unit 260, a hardware mapping unit 270, and the neural network DB 280. The hardware mapping unit 270 may create a neural network graph corresponding to the new neural network configuration information, and may create a resource graph corresponding to hardware resource information. Further, the hardware mapping unit 270 may map the neural network graph to the resource graph using a graph-mapping algorithm. In this way, the hardware mapping unit 270 may generate a new neural network in the neuromorphic hardware. Also, the ratio adjustment unit 260 may further perform the operations of comparing the resource graph with the neural network graph and proportionately adjusting the neural network graph in conformity with the resource graph.

That is, the generated neural network may be mapped to the neuromorphic hardware in accordance with the resource information of the neuromorphic hardware. The mapping algorithm used here may be an existing graph-mapping algorithm, and is intended to map the neural network graph to the resource graph.

In the case of a neural network that matches each purpose or function, the types and numbers of neurons required for each subpart of the brain are designated, but the hardware resources provided by the system may not match designated types and numbers. Therefore, the neural network generation apparatus 130 needs to proportionately adjust the neural network in accordance with resources during a hardware mapping procedure. In particular, when the resources are insufficient, the neural network must be reduced and mapped.

The new neural network generated by the hardware mapping unit 270 may be stored in the neural network DB. That is, when the use of the new neural network in the application of the neuromorphic system is terminated or when a neural network required by the application is changed to another network, the new neural network may be stored together with changed internal parameter values in the neural network DB, and may then be prepared for a subsequent request from the application.

Further, when it is determined by the neural network DB determination unit 240 that the existing neural network is present in the neural network DB 280, the neural network DB determination unit 240 may send a request to load the existing neural network to the neural network DB 280, and the neural network DB 280 may load the existing neural network into the hardware mapping unit 270 in response to the request.

By means of this method, the hardware mapping unit 270 may output the neural network 290 generated by mapping the existing neural network or the new neural network, which corresponds to the neural network function requested to be generated by the application, to the neuromorphic hardware.

Figure 3:
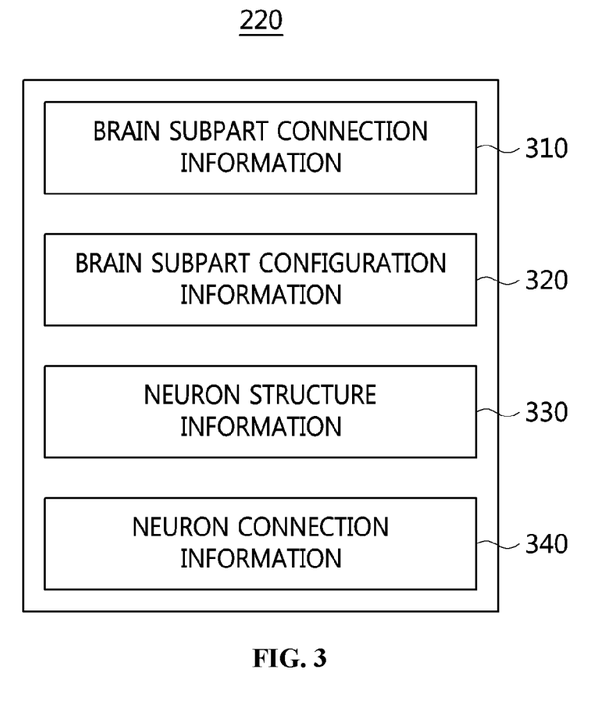
FIG. 3 is a diagram illustrating an example of the brain information database (DB) illustrated in FIG. 2.

FIG. 3 is a diagram illustrating an example of the brain information DB 220 illustrated in FIG. 2.

Referring to FIG. 3, the brain information DB 220 may include brain subpart connection information 310, brain subpart configuration information 320, neuron structure information 330, and neuron connection information 340.

Neurons and synapses that form a neuromorphic computing system actually appear in various forms. The types of neuron may be classified into various forms, such as a pyramid cell, a stellate cell, a basket cell, and a chandelier cell, according to the shape thereof. Further, for respective neuron types, there are various structures, such as various lengths of axons forming the corresponding neurons and various locations of dendrites. Further, a synapse which is connected at the axon to another neuron may deliver information through an electrical conduction phenomenon as a signal delivery scheme, or may chemically deliver information by moving a neurotransmitter as the signal delivery scheme. As described above, the types and numbers of neurons and synapses that are chiefly configured may differ depending on the part of the brain. Therefore, the database which stores information about neurons and synapses constituting the part of the brain may be the brain information DB 220, and the neural network may be configured as closely to the configuration of the brain as possible based on the pieces of information stored in the brain information DB 220.

First, the brain subpart connection information 310 may include the form of connections between the brain subparts, the direction of a flow of connection signals between the brain subparts, or the size of a neural network in connecting portions. The brain subpart connection information 310 denotes connection information which connects the brain subparts to each other. Assuming that there are subparts A1, A2, and A3, the subparts may be connected only in a series form, such as A1-A2-A3, and a signal flow thereof may progress only in the direction of A1-A2-A3. Also, the size of the neural network which connects A1-A2 may be set to about ¼ of the size of A1 and A2.

The brain subpart configuration information 320 may include the number of neurons forming each subpart, the types of neurons or the composition ratio of the respective neuron types. The brain subpart configuration information 320 may include the sizes of the subparts. That is, the brain subpart configuration information 320 may include the number of neurons or synapses forming each subpart. Further, the brain subpart configuration information 320 may include the types (kinds) of neurons forming each subpart, the distribution ratio of respective neuron types (kinds), etc.

The neuron structure information 330 may include the sizes and lengths of a soma (i.e., a nerve cell body), dendrites, and synapses, which form each neuron. Each neuron is generally composed of a soma (i.e., nerve cell body) which contains a cell nucleus, dendrites which function as an input, an axon which functions as an output, and synapses which are junctions between neurons. The types (kinds) of neurons may be classified into various forms, such as a pyramid cell, a stellate cell, a basket cell, and a chandelier cell. Further, for respective types of the neurons, the features of parts which form respective neurons, for example, sizes or lengths thereof, may differ from each other. These features are included in the neuron structure information 330.

The neuron connection information 340 may include a stimulus delivery scheme, which may be any one of an electrical stimulus delivery scheme and a chemical stimulus delivery scheme.

Figure 4:
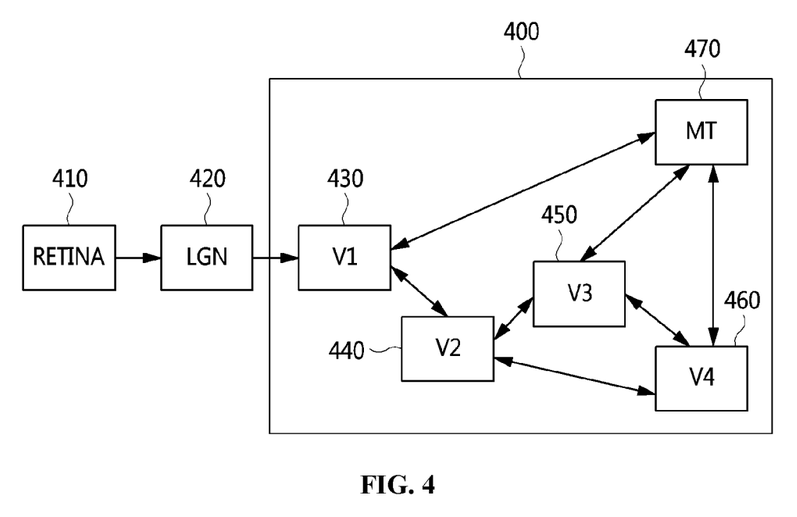
FIG. 4 is a diagram illustrating a neural network corresponding to the visual processing function of the brain, generated according to an embodiment of the present invention.

FIG. 4 is a diagram illustrating a neural network corresponding to the visual processing function of the brain that is generated according to an embodiment of the present invention.

An example of generation of a neural network which imitates the visual processing function of the brain using a neural network generation method for neuromorphic computing according to the present invention will be described with reference to FIG. 4.

First, assuming that the application requests the generation of a "neural network for identifying an object from a camera input image', the brain part corresponding to the function of the neural network includes the visual processing part 400 of the brain, and further includes a retina 410 and a Lateral Geniculate Nucleus (LGN) 420. Visual information received through the retina 410 is input to the visual processing part 400 of the brain via the LGN 420 and is used to check what the visual information is, where the visual information is present, etc. Therefore, the part to be configured and generated through the neural network generation method according to the present invention is the visual processing part 400 of the brain.

First, based on the brain subpart connection information, subparts forming the visual processing part 400 of the brain may be selected. As the subparts, V1 430 for sensing a color, V2 440 for sensing a shape, V3 450 for sensing a change in shape, and V4 460 for sensing motion may be selected. Also, based on the brain subpart connection information, respective subparts are arranged, as shown in FIG. 4, such that connections of V1-V2-V3-V4, V2-V4, and V3-V4 are made. Further, the values of V1, V3, and V4 are connected to Machine Training (MT) 470 which indicates machine training, and are used to calculate the output of the neural network.

Furthermore, neural sets which form the brain subparts may be selected based on information about the configuration of the brain subparts V1, V2, V3, and V4. For example, a neuron set which forms V1 may be established such that 100 neurons are connected in series and are configured at a 1:1 ratio of pyramid cells to stellate cells and such that some specific neurons, among the 100 neurons, have a soma (nerve cell body), dendrites, and synapses, the sizes or lengths of which are twice those of normal neurons, and a scheme for connecting individual neurons is set only to an electrical stimulus delivery scheme. Further, a neuron set which forms V2 may be established such that 50 neurons are connected in parallel and are configured at a 2:1 ratio of basket cells to chandelier cells and such that some specific neurons, among the 50 neurons, have a soma, dendrites, and synapses, the sizes or lengths of which are ½ of those of normal neurons, and a scheme for connecting individual neurons is set only to a chemical stimulus delivery scheme. Also, the remaining subparts V3 and V4 may be configured in the same manner as the above-described subparts V1 and V2, but the configuration form thereof may be similar to or different from that of V1 and V2.

In this way, the neural network which takes charge of the visual processing function required by the application is configured, as illustrated in FIG. 4, and the neural network configuration information is transferred to the neural network generation apparatus. Thus, the neural network generation apparatus may generate the neural network by mapping the neural network to neuromorphic hardware.

Figure 5:
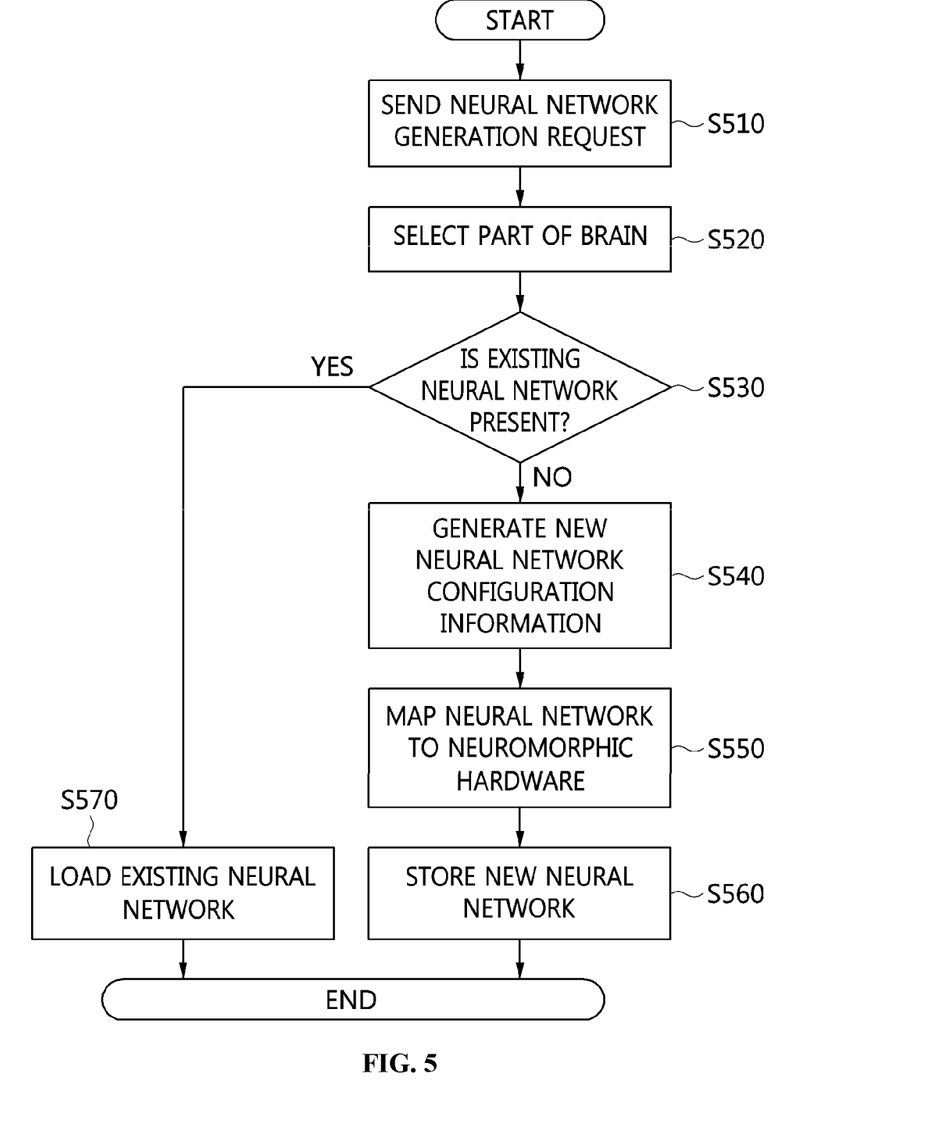
FIG. 5 is an operation flowchart illustrating a neural network generation method for neuromorphic computing according to an embodiment.

FIG. 5 is an operation flowchart illustrating a neural network generation method for neuromorphic computing according to an embodiment.

Referring to FIG. 5, an application sends a neural network generation request to a neural network configuration apparatus at step S510. Further, the neural network configuration apparatus selects at least one part of the brain corresponding to the function of the neural network requested to be generated at step S520.

When the neural network generation request is received, the neural network configuration apparatus may search for the neural network function desired to be used by the application, and may select at least one part of the brain corresponding to the neural network function. Here, parts of the brain may include a visual processing part, an auditory processing part, etc. For example, when the identification of an image is requested, the visual processing part may be selected from among the parts of the brain, and when simultaneous identification of sound (audio) and an image is requested, the visual processing part and the auditory processing part may be selected from among the parts of the brain.

The neural network configuration apparatus may determine whether an existing neural network corresponding to the at least one part of the brain is present in a neural network DB at step S530.

The neural network configuration apparatus may determine whether an existing neural network corresponding to the at least one part of the brain is present in a neural network DB. The neural network DB is a database (DB) in which neural networks previously generated by a neural network generation system are stored. If it is determined that an existing neural network that is capable of performing the function required by the application is present, there is no need to configure and generate a new neural network, and thus the neural network generation system first checks the neural network DB and generates a new neural network only when no existing neural network is present in the neural network DB.

When the existing neural network is present, the neural network configuration apparatus may load the existing neural network from the neural network DB at step S570. However, when no existing neural network is present, the neural network configuration apparatus may generate new neural network configuration information corresponding to the part of the brain based on a brain information DB at step S540.

The brain information DB may include information about connections between brain subparts constituting each part of the brain, information about the configuration of the brain subparts, neuron structure information, and neuron connection information. Therefore, the neural network configuration apparatus may perform the operations of configuring the brain subparts based on the brain subpart connection information, establishing neuron sets which form the brain subparts based on the brain subpart configuration information, and configuring neurons which form the neuron sets based on the neuron structure information and the neuron connection information.

Further, the brain subpart connection information may include the form of connections between the brain subparts, the direction of a flow of connection signals between the brain subparts, or the size of the neural network in connecting portions. The brain subpart configuration information may include the number of neurons forming each subpart, the types of the neurons or the composition ratio of the respective neuron types. The neuron structure information may include the sizes and lengths of a soma (i.e., a nerve cell body), dendrites, and synapses, which form each neuron. The neuron connection information may include a stimulus delivery scheme, which may be any one of an electrical stimulus delivery scheme and a chemical stimulus delivery scheme.

As a result, the neural network configuration apparatus may collect information about neuron sets and neurons which form the part of the brain from the brain information DB, and may generate new neural network configuration information. Therefore, in order to implement a neuromorphic computing system, a procedure for constructing the brain information DB must be performed in advance. Further, the brain information DB may be constructed differently depending on the user and the usage environment of the system.

Next, a new neural network is generated by mapping the new neural network to the neuromorphic hardware based on the new neural network configuration information at step S550.

The generated neural network may be mapped to the neuromorphic hardware in accordance with the resource information of the neuromorphic hardware. The mapping algorithm used here may be an existing graph-mapping algorithm, and is intended to map the neural network graph to the resource graph. In a neural network that matches each purpose, the types and numbers of neurons required for each subpart of the brain are designated. When the hardware resources that are provided do not match designated types and numbers, there is a need to proportionately adjust the neural network in accordance with the resources during a mapping procedure. In particular, when the resources are insufficient, the neural network must be reduced and mapped.

Furthermore, the new neural network is stored in the neural network DB at step S560. The new neural network generated based on the hardware in this way may be stored in the neural network DB. That is, when the use of the new neural network in the application of the neuromorphic system is terminated or when a neural network required by the application is changed to another network, the new neural network may be stored together with changed internal parameter values in the neural network DB, and may then be prepared for a subsequent request from the application.

Figure 6:
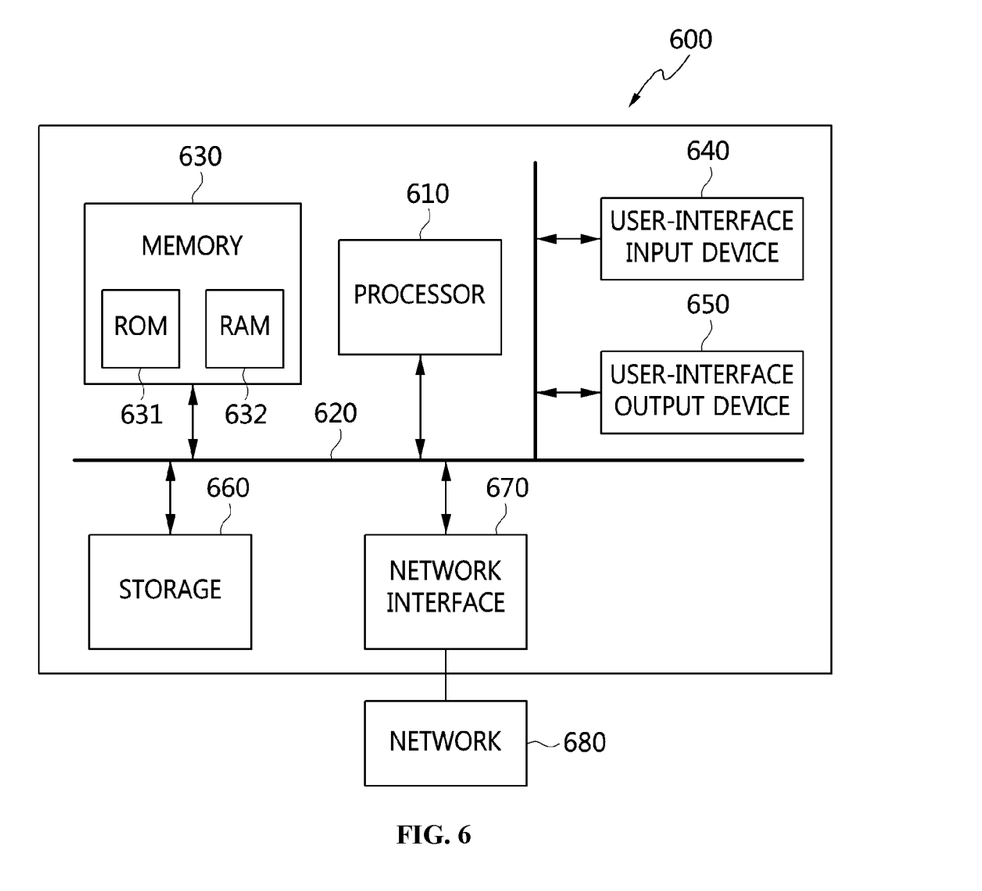
FIG. 6 is a diagram illustrating the configuration of a computer system according to an embodiment.

FIG. 6 is a diagram illustrating the configuration of a computer system according to an embodiment.

The neural network configuration apparatus for neuromorphic computing or the neural network generation apparatus for neuromorphic computing according to the embodiment may be implemented in a computer system 600, such as a computer-readable storage medium.

The computer system 600 may include one or more processors 610, memory 630, a user interface input device 640, a user interface output device 650, and storage 660, which communicate with each other through a bus 620. The computer system 600 may further include a network interface 670 connected to a network 680. Each processor 610 may be a Central Processing Unit (CPU) or a semiconductor device for executing programs or processing instructions stored in the memory 630 or the storage 660. Each of the memory 630 and the storage 660 may be a storage medium including at least one of a volatile medium, a nonvolatile medium, a removable medium, a non-removable medium, a communication medium or an information delivery medium. For example, the memory 630 may include Read-Only Memory (ROM) 631 or Random Access Memory (RAM) 632.

The present invention may provide a neural network generation method and apparatus for neuromorphic computing, which store information about the configuration form of brain neurons depending on the parts of the brain and which configure a neural network in an optimal form in which the brain is imitated as closely thereto as possible depending on the situation and purpose in which a neuromorphic computing system is used based on the stored information.

Further, the present invention may provide a method that can configure a neural network which performs functions requested by an application in consideration of the resources of neuromorphic hardware.

Although the embodiments of the present invention have been disclosed, those skilled in the art will appreciate that the present invention can be implemented in other concrete forms, without departing from the technical spirit or essential features of the invention as disclosed in the accompanying claims. Therefore, it should be understood that the exemplary embodiment is only for illustrative purpose and do not limit the bounds of the present invention.

What is claimed is:

1. A neural network generation method for neuromorphic computing, the method comprising:
receiving a request for generating a new neural network corresponding to a neural network function requested by an application;
generating neural network configuration information corresponding to the neural network function;
generating the new neural network by mapping the new neural network to neuromorphic hardware based on the neural network configuration information; and
storing the new neural network in a neural network database,
wherein generating the new neural network comprises:
creating a neural network graph corresponding to the new neural network configuration information;
creating a resource graph corresponding to resource information of the neuromorphic hardware; and
mapping the neural network graph to the resource graph using a graph-mapping algorithm.

2. The neural network generation method of claim 1, wherein generating the neural network configuration information is performed using a brain information database that includes brain subpart connection information, which is information about connections between brain subparts forming a part of a brain, brain subpart configuration information, neuron structure information, and neuron connection information.

3. The neural network generation method of claim 2, wherein generating the neural network configuration information comprises:
configuring the brain subparts based on the brain subpart connection information;
establishing neuron sets that form the brain subparts based on the brain subpart configuration information; and
configuring neurons that form the neuron sets based on the neuron structure information and the neuron connection information.

4. The neural network generation method of claim 1, wherein generating the new neural network further comprises:
comparing the resource graph with the neural network graph; and
adjusting the neural network graph proportionally to the resource graph.

5. The neural network generation method of claim 2, wherein the brain subpart connection information includes a form of connections between the brain subparts, a direction of a flow of connection signals between the brain subparts, or a size of the neural network in a connecting portion.

6. The neural network generation method of claim 2, wherein the brain subpart configuration information includes a number of neurons forming the subparts, types of the neurons, or a percentage of configurations for each of the types of the neurons.

7. The neural network generation method of claim 2, wherein the neuron structure information includes sizes and lengths of a soma, a dendrite, and a synapse that form each neuron.

8. The neural network generation method of claim 2, wherein the neuron connection information includes a stimulus delivery scheme, and
the stimulus delivery scheme is any one of an electrical stimulus delivery scheme and a chemical stimulus delivery scheme.

9. The neural network generation method of claim 1, further comprising:
determining whether an existing neural network corresponding to the neural network function is present in the neural network database; and
when it is determined that the existing neural network is present, loading the existing neural network from the neural network database.

10. A neural network generation system for neuromorphic computing, comprising:
a neural network configuration apparatus comprising:
a first processor configured to receive a request for generating a new neural network corresponding to a neural network function requested by an application, generate new neural network configuration information corresponding to the neural network function; and
a first memory configured to store the new neural network configuration information; and
a neural network generation apparatus comprising:
a second processor configured to receive the new neural network configuration information from the neural network configuration apparatus, generate the new neural network by mapping the new neural network to neuromorphic hardware based on the new neural network configuration information; and
a second memory configured to store the new neural network,
wherein the second processor is configured to:
create a neural network graph corresponding to the new neural network configuration information,
create a resource graph corresponding to resource information of the neuromorphic hardware, and
map the neural network graph to the resource graph using a graph-mapping algorithm.

11. The neural network generation system of claim 10, wherein the new neural network configuration information is generated using a brain information database that includes brain subpart connection information, which is information about connections between brain subparts forming a part of a brain, brain subpart configuration information, neuron structure information, and neuron connection information.

12. The neural network generation system of claim 11, wherein the first processor is configured to:
configure the brain subparts based on the brain subpart connection information,
establish neuron sets that form the brain subparts based on the brain subpart configuration information, and
configure neurons that form the neuron sets based on the neuron structure information and the neuron connection information.

13. The neural network generation system of claim 11, wherein the brain subpart connection information includes a form of connections between the brain subparts, a direction of a flow of connection signals between the brain subparts, or a size of the neural network in a connecting portion.

14. The neural network generation system of claim 11, wherein the brain subpart configuration information includes a number of neurons forming the subparts, types of the neurons, or a percentage of configurations for each of types of the neurons.

15. The neural network generation system of claim 11, wherein the neuron structure information includes sizes and lengths of a soma, a dendrite, and a synapse that form each neuron.

16. The neural network generation system of claim 11, wherein the neuron connection information includes a stimulus delivery scheme, and
the stimulus delivery scheme is any one of an electrical stimulus delivery scheme and a chemical stimulus delivery scheme.

17. A neural network generation apparatus for neuromorphic computing, comprising:
a processor configured to receive new neural network configuration information generated based on a brain information database from a neural network configuration apparatus, generate a new neural network by mapping the new neural network to neuromorphic hardware based on the new neural network configuration information, and load an existing neural network from a neural network database; and
a memory configured to store the new neural network,
wherein the processor is configured to:
create a neural network graph corresponding to the new neural network configuration information;
create a resource graph corresponding to resource information of the neuromorphic hardware; and
map the neural network graph to the resource graph using a graph-mapping algorithm.

18. The neural network generation of claim 17, wherein the processor is configured to:
compare the resource graph with the neural network graph, and
adjust the neural network graph proportionally to the resource graph.

* * * * *